UNITED STATES PATENT OFFICE.

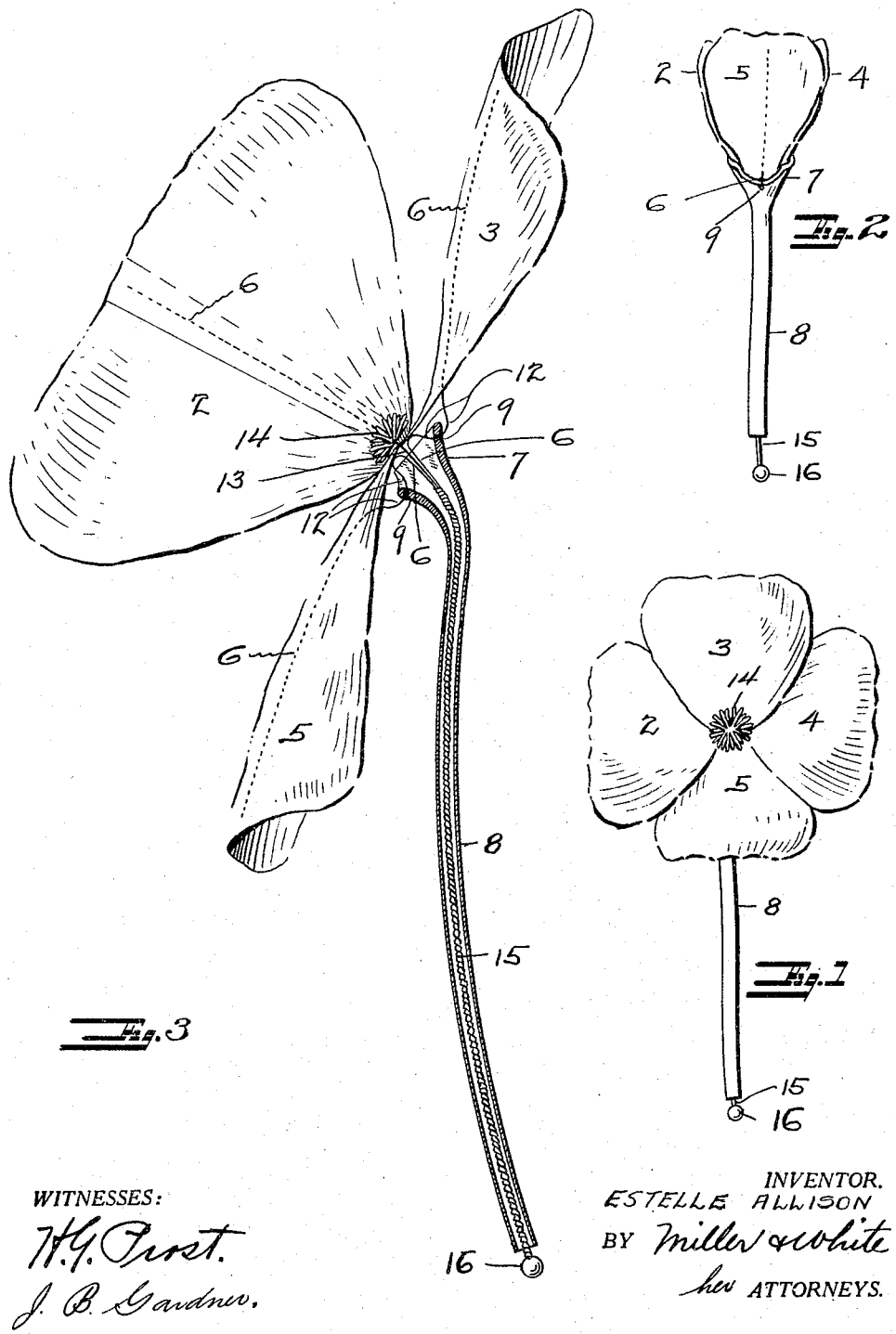

ESTELLE ALLISON, OF SAN FRANCISCO, CALIFORNIA.

ARTIFICIAL FLOWER.

1,148,208.  Specification of Letters Patent.  Patented July 27, 1915.

Application filed August 6, 1914. Serial No. 855,389.

*To all whom it may concern:*

Be it known that I, ESTELLE ALLISON, a citizen of the United States, and a resident of the city and county of San Francisco, State of California, have invented certain new and useful Improvements in Artificial Flowers, of which the following is a specification.

One of the objects of my invention is to provide a collapsible flower.

The flower of my invention is adapted to be worn on the coat or corsage and is so constructed that at will it may be collapsed into a bud, or opened to form the full flower.

It is adapted, among several uses, to be used as a badge or souvenir of some event or occasion, and a suitable legend, word, or other device, may be printed on one or more of the petals of the flower to signify the occasion.

The invention possesses other advantageous features, some of which, with the foregoing, will be set forth at length in the following description, where I shall outline in full that form of the invention which I have selected for illustration in the drawings accompanying and forming part of the present specification.

The drawings illustrate one specific form of my invention and the invention may be embodied in a multiplicity of forms, each being a species of my said invention.

It is to be understood that by the claims succeeding the description of my invention I desire to cover the invention in whatever form it may be embodied.

Referring to said drawings: Figure 1 is a front view of the flower of my invention. Fig. 2 is a front view showing the flower closed or as a bud. Fig. 3 is a vertical section of the open flower on a larger scale.

In the drawings I have shown a flower having four petals 2—3—4—5, but the number or shape of petals may be varied depending upon the flower to be imitated. The petals are preferably formed of silk cloth colored or otherwise tinted in imitation of the natural flower. Each petal is preferably formed with a fold or plait along its center line, and between the folds is arranged a wire 6, which is sufficiently stiff to hold the petal in position and stiffen it sufficiently to prevent it from folding on itself. The petal is preferably held to the wire by gluing or otherwise fastening the layers of the fold together.

The petals are arranged with their inner ends congregated at the torus or receptacle 7 which is formed hollow and preferably integral with the hollow stem 8. The receptacle and stem may be formed of sheet metal or other suitable material and is preferably painted or colored green in imitation of the natural flower. Formed in the wall of the receptacle adjacent its upper end are passages 9, one for each wire 6. The wire 6 emerges from the petal at a short distance from the upper edge of the receptacle and passes through the proper passage 9 and extends downward through the hollow stem. The wire 6 at that portion which passes through the passage is formed with a downwardly curved portion 12, the inner portion of which extends upwardly in the receptacle, from which point it is bent downward into the stem. The inner ends of the petals are secured to the wire 13 which extends down through the stem, and at the point of juncture of the petals, I preferably arrange a small tuft 14 in imitation of the stamens or center of the flower, which tuft is preferably secured to the wire 13. The wires 6 and 13 are braided or twisted together in the stem to increase their rigidity and to insure their moving in unison, and to the lower end of the twisted wire 15 is secured a knob or ball 16.

When the flower is in the open position and the wires are pulled, the wires 6 slide in the passages 9, and the petals are moved together to form the closed flower or bud, and when in this position, the wires are pushed, the petals are moved to produce the open flower. When the wires are pushed upward or pulled downward in the stem, the curved portions 12 of the wires slide slightly in their passages 9, thereby causing a movement of the petals outward or inward. When the wires are pushed, they slide inward through the passages and when they are pulled they slide outwardly in the passages, and the sliding of the curved portions cause the portions of the wires which are attached to the petals to move outwardly or inwardly. The front face of the receptacle 7 is preferably cut away at the upper edge to allow the petal 5 to be moved into a somewhat pendant position.

I claim:

1. A collapsible flower comprising a stem, relatively stiff movable wires extending through said stem and projecting beyond the stem, and flexible petals secured to the projecting portions of the wires, said projecting portions of the stiff wires serving as bracing means for the flexible petals.

2. A collapsible flower comprising a hollow stem, movable wires extending through said stem and projecting beyond said stem and petals secured to said projecting portions, the projecting portions being attached to the petals along substantially their entire length.

3. A collapsible flower comprising a hollow stem, having a plurality of passages therein adjacent its upper edge, wires extending through said stem and passages, and petals attached to said wires.

4. A collapsible flower comprising a hollow stem provided with passages adjacent its upper edge, wires extending through said stem and passages, petals attached to said wires at those portions which project through the passages, the inner ends of the petals overlying the stem, and a wire attached to the inner ends of said petals.

5. A collapsible flower comprising a hollow stem provided with passages adjacent its upper edge, wires extending through said stem and passages, said wires being bent in downward curves at that portion which passes through the passages, and a petal attached to each wire at that portion which projects beyond the stem.

6. A collapsible flower comprising a hollow stem and receptacle, said receptacle having a depression in the upper edge of the front wall thereof, and having passages therethrough, wires extending through said stem and passages and projecting beyond the receptacle, and petals secured to the projecting portions of the wires.

In testimony whereof, I have hereunto set my hand at San Francisco, California, this 31st day of July 1914.

ESTELLE ALLISON.

In presence of—
H. G. PROST,
P. S. PIDWELL.

Copies of this patent may be obtained for five cents each, by addressing the "Commissioner of Patents, Washington, D. C."